United States Patent
Nakajima et al.

(10) Patent No.: US 9,260,606 B2
(45) Date of Patent: Feb. 16, 2016

(54) SILICONE RUBBER SPONGE AND RUBBER-COVERED ROLLER

(75) Inventors: Shingo Nakajima, Osaka (JP); Jun Sugawara, Osaka (JP); Yasuhiro Fukumoto, Osaka (JP); Naoki Onmori, Osaka (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

(*) Notice: Subject to any disclaimer, the term of this patent is extended or adjusted under 35 U.S.C. 154(b) by 0 days.

(21) Appl. No.: 13/823,258

(22) PCT Filed: Jun. 27, 2012

(86) PCT No.: PCT/JP2012/066362
§ 371 (c)(1),
(2), (4) Date: Mar. 14, 2013

(87) PCT Pub. No.: WO2013/005613
PCT Pub. Date: Jan. 10, 2013

(65) Prior Publication Data
US 2013/0178348 A1    Jul. 11, 2013

(30) Foreign Application Priority Data
Jul. 4, 2011    (JP) .................. 2011-147893

(51) Int. Cl.
| C08L 83/04 | (2006.01) |
| C08J 9/32 | (2006.01) |
| G03G 15/20 | (2006.01) |
| F16C 13/00 | (2006.01) |
| C08J 9/00 | (2006.01) |
| C08K 7/22 | (2006.01) |

(52) U.S. Cl.
CPC ............... *C08L 83/04* (2013.01); *C08J 9/0061* (2013.01); *C08J 9/32* (2013.01); *F16C 13/00* (2013.01);
(Continued)

(58) Field of Classification Search
CPC ......... C08L 83/04; C08J 9/32; C08J 2383/04; C08J 2201/026; F16C 13/00; F16C 2208/14; G03G 15/20; G03G 15/206
USPC .................. 428/313.5, 322.7, 317.9; 521/134
See application file for complete search history.

(56) References Cited

U.S. PATENT DOCUMENTS 5,985,954 A * 11/1999 Tsuchida et al. .............. 523/400
6,328,682 B1 * 12/2001 Shudo ............................ 492/56
(Continued)

FOREIGN PATENT DOCUMENTS

| JP | H05-214250 A | 8/1993 |
| JP | 9-3333 | 1/1997 |

(Continued)

OTHER PUBLICATIONS

Abstract of JP 2004-098306, Onda et al., Apr. 2004, 4 pages.*

*Primary Examiner* — Hai Vo
(74) *Attorney, Agent, or Firm* — Drinker Biddle & Reath LLP

(57) ABSTRACT

Provided are a silicone rubber sponge that forms an elastic layer of a pressure roller of an image-forming apparatus, and that has a high mechanical strength so as to be used in a high-speed image-forming apparatus or a color image-forming apparatus, and a rubber-covered roller including the silicone rubber sponge. The silicone rubber sponge is produced by mixing expanded resin microballoons with a low-molecular-weight silicone rubber to prepare a compound A, mixing a high-molecular-weight silicone rubber with the compound A to prepare a silicone rubber compound, and heating the silicone rubber compound at a temperature lower than a softening point of the resin microballoons to cure the silicone rubbers.

4 Claims, 2 Drawing Sheets

(52) U.S. Cl.
CPC .............. *G03G 15/20* (2013.01); *G03G 15/206* (2013.01); *C08J 2201/026* (2013.01); *C08J 2319/00* (2013.01); *C08J 2383/04* (2013.01); *C08J 2419/00* (2013.01); *C08J 2483/04* (2013.01); *C08K 7/22* (2013.01); *Y10T 428/249972* (2015.04); *Y10T 428/249986* (2015.04); *Y10T 428/249999* (2015.04)

(56) References Cited

U.S. PATENT DOCUMENTS

| | | |
|---|---|---|
| 6,459,878 B1 * | 10/2002 | Tomoyuki et al. ............ 399/331 |
| 2001/0044479 A1 * | 11/2001 | Baba et al. ..................... 521/76 |
| 2006/0293441 A1 * | 12/2006 | Yano et al. ..................... 524/588 |
| 2011/0176221 A1 * | 7/2011 | Tanaka et al. ................. 359/666 |
| 2013/0197254 A1 * | 8/2013 | Li et al. ......................... 556/467 |

FOREIGN PATENT DOCUMENTS

| | | | |
|---|---|---|---|
| JP | 2000-230541 | | 8/2000 |
| JP | 2001-182738 | | 7/2001 |
| JP | 2002-70838 | | 3/2002 |
| JP | 2002-148988 | | 5/2002 |
| JP | 2003-321609 | | 11/2003 |
| JP | 2004-12708 | | 1/2004 |
| JP | 2004098306 A | * | 4/2004 |
| JP | 2008-197585 | | 8/2008 |
| JP | 2012-153774 A | | 8/2012 |

* cited by examiner

SILICONE RUBBER SPONGE AND RUBBER-COVERED ROLLER

TECHNICAL FIELD

The present invention relates to a silicone rubber sponge composed of a silicone rubber containing pores (air bubbles) dispersed therein. The present invention also relates to a rubber-covered roller including an elastic layer composed of the silicone rubber sponge.

The silicone rubber sponge and the rubber-covered roller of the present invention are mainly used in a fixing member of an image-forming apparatus, and, in particular, are suitably used as a pressure roller. Therefore, a description will be mainly made of a case where the silicone rubber sponge and the rubber-covered roller of the present invention are used as such a pressure roller. However, applications of the silicone rubber sponge and the rubber-covered roller of the present invention are not limited to a pressure roller. For example, a fixing roller having a heat-insulating structure is desired for a fixing unit in which heating is conducted from a back surface of a sheet and a fixing unit in which the surface of a fixing roller is heated and a toner is fixed by the preheating. The silicone rubber sponge and the rubber-covered roller of the present application are also suitably used as such a fixing roller. Furthermore, the silicone rubber sponge and the rubber-covered roller of the present application are used as a paper discharge roller that corrects winding of a sheet by pressing the sheet in the reverse direction immediately after fixing.

BACKGROUND ART

In a final stage of printing or copying in image-forming apparatuses such as an electrophotographic copy machine, a facsimile, and a laser beam printer, a heat fixing method is generally employed in which an image is fixed by bringing a pressure roller into contact with a fixing sleeve, fixing tube, or fixing roller having a heating source therein under pressure, and causing a transfer-receiving material having a transferred toner image thereon to pass therebetween, thus melting a toner by heating.

A rubber-covered roller including a core serving as a roller base and a rubber layer for imparting elasticity, the rubber layer being disposed on the core, is widely used as a pressure roller. A known example of the rubber layer for imparting elasticity is composed of a rubber sponge, in particular, a silicone rubber sponge, containing pores (air bubbles) dispersed therein.

A silicone rubber sponge containing air bubbles dispersed therein can be produced by, for example, a method including dispersing a foaming agent in a silicone rubber, and then curing the silicone rubber while foaming the foaming agent. However, according to this method, the resulting rubber surface may become uneven because, for example, foamed cells are exposed through a wall of the silicone rubber or an irregular foaming stress is generated in the silicone rubber and the stress is released. When depressions are formed on the rubber surface, the depressions remain on the surface even in the case where a releasing layer is formed on the rubber surface, which may result in a problem of stains forming on the pressure roller due to a molten toner, etc.

To address the above problem, a method for producing a silicone rubber sponge containing air bubbles dispersed therein has also been studied in which unexpanded resin microballoons are mixed in a liquid silicone rubber and the rubber is then cured by heating while expanding the resin microballoons. However, this method tends to cause a problem of unevenness of air bubbles. Consequently, a method has also been proposed in which (expanded) resin microballoons that have been expanded in advance are mixed in a liquid silicone rubber and the silicone rubber is then cured at a temperature equal to or lower than the melting point of the resin. For example, PTL 1 discloses a silicone rubber sponge containing air bubbles (pores) formed by expanded resin microballoons dispersed therein, and a pressure roller including an elastic layer composed of this silicone rubber sponge.

This elastic layer is formed by applying, onto a core, a mixture prepared by dispersing expanded resin microballoons in a liquid silicone rubber, and curing the liquid silicone rubber by conducting heating at a temperature lower than a softening point of the resin microballoons, and the resin microballoons are broken after curing. This is because when shells of the resin microballoons remain in the resulting silicone rubber sponge, the shells may be broken as a result of thermal history during use of the silicone rubber sponge as a pressure roller and thus the fixing performance may vary. Thus, this problem is solved by breaking the shells in advance. This silicone rubber sponge is widely used as a pressure roller in an apparatus for forming a monochrome image.

CITATION LIST

Patent Literature

PTL 1: Japanese Unexamined Patent Application Publication No. 2002-148988

SUMMARY OF INVENTION

Technical Problem

In the method for producing a silicone rubber sponge disclosed in PTL 1 etc., first, it is necessary to mix resin microballoons with a liquid silicone rubber and to uniformly disperse the resin microballoons in the rubber. However, in the case where the liquid silicone rubber has a high molecular weight and a high viscosity, the viscosity is further increased by mixing the resin microballoons, and thus it becomes difficult to uniformly disperse the balloons. Specifically, mixing at a high shear stress with a roll mill or the like is necessary for uniform dispersion, and consequently, the resin microballoons are broken by the shear stress during mixing. It order to solve this problem, a liquid silicone rubber having a low viscosity is used.

On the other hand, a liquid silicone rubber having a low viscosity has a low molecular weight, and an elastic layer formed by curing the liquid silicone rubber tends to be poor in terms of mechanical strength. As a result, when the layer is used as an elastic layer of a pressure roller, problems in terms of durability etc. tend to occur.

Recently, in particular, with the advancement of high-speed printing and color image-forming apparatuses, the number of cases where a large impact is applied due to compression during fixing and the number of cases where a large pressure is applied have been increasing. As a result, a problem in that the elastic layer is broken during use and it becomes difficult to use the image-forming apparatus more frequently occurs. In order to address this problem, a higher mechanical strength is required for the elastic layer. However, an elastic layer obtained from a liquid silicone rubber having a low viscosity has a low mechanical strength. Accordingly, it is difficult to use such an elastic layer in a pressure roller for a high-speed image-forming apparatus or a color image-forming apparatus because of low durability of the elastic layer.

An object of the present invention is to provide a silicone rubber sponge that forms an elastic layer of a pressure roller of an image-forming apparatus, the silicone rubber sponge being capable of being used in a high-speed image-forming apparatus or a color image-forming apparatus and having a high mechanical strength. The present invention also provides a highly durable rubber-covered roller including the silicone rubber sponge.

Solution to Problem

As a result of intensive studies conducted by the inventor of the present invention in order to solve the above problems, it was found that a silicone rubber sponge having a high mechanical strength can be obtained by blending expanded resin microballoons with a silicone rubber having a relatively low molecular weight and sufficiently mixing the expanded resin microballoons, then adding a silicone rubber having a relatively high molecular weight thereto, and mixing the resulting mixture. It was also found that a highly durable pressure roller having a mechanical strength that is sufficient for use in a high-speed image-forming apparatus or a color image-forming apparatus can be produced by using this silicone rubber sponge. These findings led to completion of the present invention.

An invention according to claim 1 is a silicone rubber sponge produced by mixing expanded resin microballoons with a low-molecular-weight silicone rubber to prepare a compound A, mixing a high-molecular-weight silicone rubber with the compound A to prepare a silicone rubber compound, and heating the silicone rubber compound at a temperature lower than a softening point of the resin microballoons to cure the silicone rubbers, wherein the relationship $M2 \times 0.5 < (M1 \times W1 + M2 \times W2)/(W1+W2)$ is satisfied, M1 is 15,000 or less, and M2 is 15,000 or more and is equal to or more than $1.2 \times M1$ where M1 represents a mass-average molecular weigh of the low-molecular-weight silicone rubber, W1 represents the amount (mass) of the low-molecular-weight silicone rubber mixed, M2 represents a mass-average molecular weigh of the high-molecular-weight silicone rubber, and W2 represents the amount (mass) of the high-molecular-weight silicone rubber mixed.

This silicone rubber sponge is produced by mixing expanded resin microballoons with a silicone rubber and dispersing the expanded resin microballoons in the silicone rubber to prepare a silicone rubber compound, and heating the silicone rubber compound at a temperature lower than a softening point of the resin microballoons to cure the silicone rubber. The curing of the silicone rubber can be performed as in the case of the silicone rubber sponge described in PTL 1.

Specifically, the silicone rubber is cured by conducting heating at a temperature lower than a softening point of the resin microballoons to cross-link the silicone rubber. The term "softening point of the resin microballoons" refers to a softening point of a resin that forms an outer shell of each of the resin microballoons. A silicone rubber sponge containing air bubbles due to the resin microballoons and dispersed therein is obtained by curing the silicone rubber.

The silicone rubber sponge of the present invention is characterized in that a silicone rubber compound in which resin microballoons are dispersed is produced by steps 1 and 2 described below.

Step 1: A step of blending resin microballoons with a low-molecular-weight silicone rubber and mixing the resulting mixture to prepare a compound.

Step 2: A step of mixing a silicone rubber having a molecular weight higher than that of the low-molecular-weight silicone rubber with the compound prepared in step 1.

Examples of the silicone rubber include liquid silicone rubbers that have been used for producing existing silicone rubber sponges. The term "low-molecular-weight silicone rubber" refers to such a silicone rubber having a mass-average molecular weight M1 of 15,000 or less. As for the low-molecular-weight silicone rubber, a single low-molecular-weight silicone rubber may be used alone or two or more low-molecular-weight silicone rubbers may be used as a mixture. For example, a mixture prepared by mixing two or more silicone rubbers having different molecular weights so as to have a mass-average molecular weight of 15,000 or less after mixing may also be used as the low-molecular-weight silicone rubber.

The term "high-molecular-weight silicone rubber" refers to a silicone rubber having a mass-average molecular weight M2 of 15,000 or more, the mass-average molecular weight M2 being 1.2 times or more the mass-average molecular weight M1 of the low-molecular-weight silicone rubber. The mass-average molecular weight is a value measured by gel permeation chromatography (GPC).

In producing a silicone rubber compound of the present invention, resin microballoons are first blended and mixed with a low-molecular-weight silicone rubber (step 1). As described above, when the viscosity of a mixture of the silicone rubber is excessively increased, it becomes difficult to mix the resin microballoons with the silicone rubber. However, in step 1, since the resin microballoons are blended with the low-molecular-weight silicone rubber having a mass-average molecular weight M1 of 15,000 or less, the resin microballoons can be uniformly dispersed in the silicone rubber by mixing.

The silicone rubber compound is prepared by further blending and mixing a high-molecular-weight silicone rubber with the compound thus produced, the compound containing the resin microballoons and the low-molecular-weight silicone rubber (step 2). By blending the high-molecular-weight silicone rubber having a mass-average molecular weight M2 of 15,000 or more, the mass-average molecular weight M2 being $1.2 \times M1$ or more, the mechanical strength of the resulting silicone rubber sponge can be improved, and a silicone rubber sponge having durability that is sufficient for use in a high-speed image-forming apparatus or a color image-forming apparatus can be obtained.

A ratio of the amount (mass) of low-molecular-weight silicone rubber (W1) and the amount (mass) of high-molecular-weight silicone rubber (W2) mixed in the silicone rubber compound satisfies the following formula:

$$M2 \times 0.5 < (M1 \times W1 + M2 \times W2)/(W1+W2)$$

When the value $(M1 \times W1 + M2 \times W2)/(W1+W2)$ is 0.5 times the mass-average molecular weight M2 of the high-molecular-weight silicone rubber or less, a silicone rubber sponge having a mechanical strength that is sufficient for use in a high-speed image-forming apparatus or a color image-forming apparatus cannot be obtained.

In the case where the low-molecular-weight silicone rubber is a mixture of three silicone rubbers having different molecular weights, the mass-average molecular weight M1 and the amount (mass) W1 are calculated as follows.

$$M1=(Ma1 \times Wa1 + Mb1 \times Wb1 + Mc1 \times Wc1)/(Wa1+Wb1+Wc1)$$

$$W1=Wa1+Wb1+Wc1$$

In the above formulae, Ma1, Mb1, and Mc1 represent mass-average molecular weights of the three silicone rubbers (a, b, and c), respectively, and Wa1, Wb1, and Wc1 represent mixing ratio (mass ratio) of the three silicone rubbers in the low-molecular-weight silicone rubber, respectively. Accordingly, the mass-average molecular weight M2 of the high-molecular-weight silicone rubber is (Ma1×Wa1+Mb1×Wb1+Mc1×Wc1)×1.2/(Wa1+Wb1+Wc1) or more, and satisfies the following formula:

$$M2 \times 0.5 < (Ma1 \times Wa1 + Mb1 \times Wb1 + Mc1 \times Wc1 + M2 \times W2)/(Wa1 + Wb1 + Wc1 + W2)$$

Note that, in the case where the low-molecular-weight silicone rubber is a mixture of two or four or more of silicone rubbers having different molecular weights, the mass-average molecular weight and the amount (mass) are calculated in the same manner as that described above.

In the present invention, expanded resin microballoons obtained by expanding unexpanded resin microballoons in advance are used as the resin microballoons. The unexpanded resin microballoons are resin fine particles in which an evaporable component such as a liquid hydrocarbon having a low boiling point is encapsulated in an outer shell composed of a thermoplastic polymer or a thermosetting polymer. When the unexpanded resin microballoons are heated, the encapsulated evaporable component evaporates and the resin microballoons expand. The term "expanded resin microballoons" refers to these resin microballoons after expansion. The thickness of the outer shell of each of the unexpanded resin microballoons is usually about 2 to 15 μm, and the average particle size of the unexpanded resin microballoons is usually about 5 to 50 μm.

The volume ratio (air bubble ratio) of air bubbles (pores) in the silicone rubber sponge can be adjusted by changing the amount of expanded resin microballoons blended in the silicone rubber compound and the degree of expansion of the expanded resin microballoons. The size of the air bubbles can be adjusted by changing the size of the expanded resin microballoons. Preferred ranges of the air bubble ratio and the average size of the air bubbles vary depending on the application of the silicone rubber sponge. Thus, preferred ranges of the amount of expanded resin microballoons blended and the average size of the expanded resin microballoons are also not particularly limited. However, the amount of expanded resin microballoons blended is usually 0.1 to 30 parts by mass, and preferably 0.5 to 20 parts by mass relative to 100 parts by mass of the total amount of silicone rubber.

The silicone rubber sponge of the present invention may further contain a reinforcing filler, an extending filler, a heat resistance additive, a colorant, a dispersion aid, an electrically conductive agent, a charge-controlling agent, a filler for adjusting thermal conductivity, etc. as long as the object of the present invention is not impaired. For example, the silicone rubber sponge may contain silica or metal silicon in order to improve thermal conductivity.

An invention according to claim 2 is the silicone rubber sponge according to claim 1, in which the mass-average molecular weight M1 is 12,000 or less. By using a low-molecular-weight silicone rubber having a mass-average molecular weight M1 of 12,000 or less, mixing and dispersion of the expanded resin microballoons can be more easily conducted, and an excellent silicone rubber sponge can be produced.

An invention according to claim 3 is the silicone rubber sponge according to claim 1 or 2, in which the mass-average molecular weight M1 is 8,000 or more and the mass-average molecular weight M2 is 17,000 or more. By controlling the mass-average molecular weight M1 of the low-molecular-weight silicone rubber to 8,000 or more and controlling the mass-average molecular weight M2 of the high-molecular-weight silicone rubber to 17,000 or more, a silicone rubber sponge having excellent mechanical strength can be produced. By using this sponge as an elastic layer, a pressure roller having excellent durability can be produced.

An invention according to claim 4 is the silicone rubber sponge according to any one of Claims 1 to 3, in which the resin microballoons are broken after curing of the silicone rubber.

When the shells of the resin microballoons remain in the silicone rubber sponge, the shells may be broken as a result of receiving thermal history during use of the silicone rubber sponge as a pressure roller, and thus the fixing performance may vary. Therefore, it is preferable to break the resin microballoons after curing of the silicone rubber. The resin microballoons are broken by conducting heating at a temperature higher than the softening point of the resin that forms the shells (outer shells).

An invention, for example, is a rubber-covered roller including a core and a rubber elastic layer disposed on a peripheral surface of the core, in which the rubber elastic layer is composed of the silicone rubber sponge according to any one of claims 1 to 4.

For example, metal cylinder is used as the core. The rubber-covered roller of the present invention is produced by forming, on the surface of the core, a rubber elastic layer composed of the silicone rubber sponge according to any one of claims 1 to 3.

The rubber-covered roller of the present invention may include a layer other than the rubber elastic layer on the core as long as the object of the present invention is not impaired. For example, in the case where the rubber-covered roller is used as a pressure roller, a surface releasing layer (surface layer) composed of a fluororesin or the like may be provided on the surface of the rubber-covered roller in order to increase a releasing property with a transfer-receiving material. Examples of the fluororesin that forms the surface releasing layer include tetrafluoroethylene-perfluoroalkylvinyl ether copolymers (PFA).

For the purpose of imparting adhesiveness, electrical conductivity, thermal conductivity, flexibility, etc., or another purpose, an interlayer may be provided between the surface releasing layer and the rubber elastic layer. Two or more interlayers may be provided according to need. An interlayer for imparting electrical conductivity is provided in order to effectively eliminate static electricity accumulated during passing of a sheet, and is, for example, a rubber layer to which electrical conductivity is imparted by blending carbon, an ion-conductive agent, or the like.

An interlayer for imparting thermal conductivity is a rubber layer having a high thermal conductivity. For example, during passing of a small-size sheet, the outer diameter of the rubber-covered roller is changed by unevenness of the temperature generated between a sheet-passing portion and a non-sheet passing portion. As a result, the elastic layer may be broken as a result of an excessive temperature rise. In order to prevent this problem by reducing the unevenness of the temperature, an interlayer having a high thermal conductivity is provided. Furthermore, flexibility may be imparted to the rubber-covered roller by providing a rubber layer having a hardness lower than that of the rubber elastic layer. By imparting flexibility, a transport property of a sheet can be improved.

In order to more effectively bring out the effect of the interlayers, the surface releasing layer preferably has a small thickness. A specific preferred example is a PFA layer having a thickness of 20 μm or less. A more preferred example is s PFA tube having a thickness of 15 μm or less.

The rubber-covered roller of the present invention may further include an adhesive layer (primer layer) for bonding between respective layers or between the rubber elastic layer and the core. In order to increase the adhesive strength between the layers, etching may be performed either chemically or electrically, and a primer suitable for the resulting surface may then be formed.

Since the rubber-covered roller includes a rubber elastic layer composed of the silicone rubber sponge of the present invention, the rubber-covered roller has a high mechanical strength that is sufficient for use as a pressure roller of a high-speed image-forming apparatus or a color image-forming apparatus and has high durability. Thus, the rubber-covered roller can be suitably used as a pressure roller of a fixing device in an image-forming apparatus.

Advantageous Effects of Invention

A silicone rubber sponge of the present invention has a high mechanical strength. A rubber-covered roller including a rubber elastic layer composed of the silicone rubber sponge of the present invention has high durability and thus can be suitably used as a pressure roller of a fixing device in an image-forming apparatus that realizes high-speed printing, color-image formation, etc.

DESCRIPTION OF EMBODIMENTS

Figure 1:
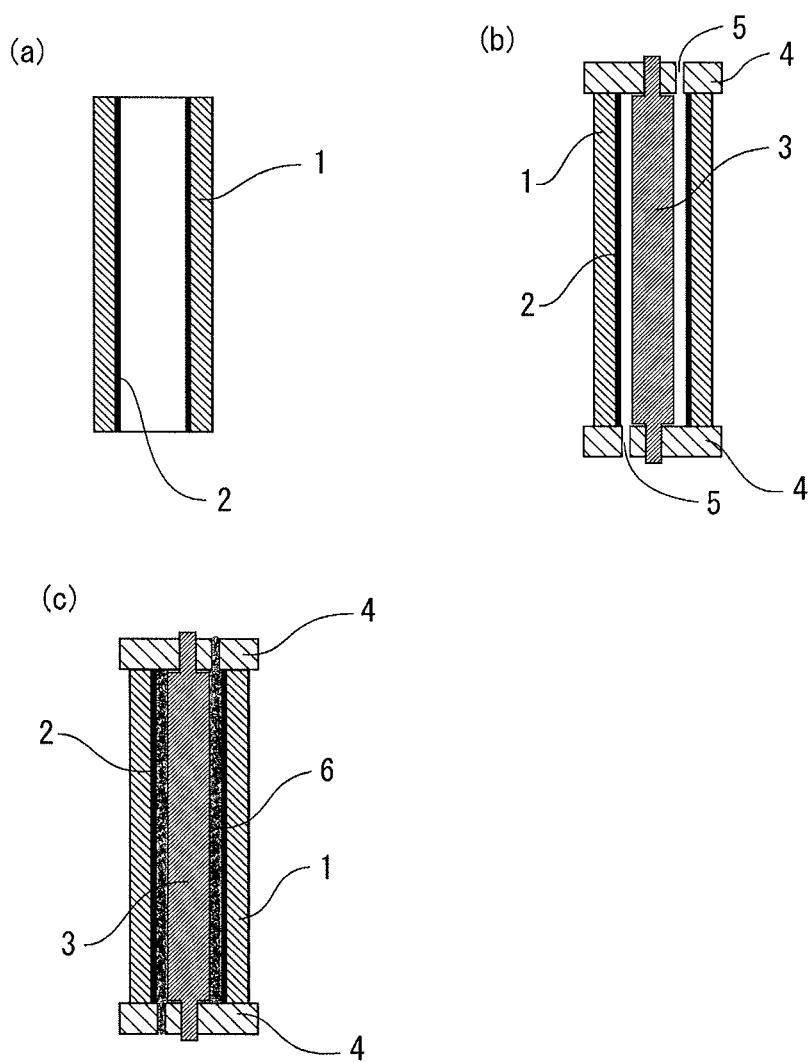
FIG. 1 includes cross-sectional views illustrating an example of a method for producing a rubber-covered roller of the present invention.

Next, embodiments for carrying out the present invention will be specifically described. It is to be understood that the present invention is not limited to the embodiments and can be changed to other embodiments as long as the object of the present invention is not impaired.

A liquid silicone rubber is used as a silicone rubber for producing a silicone rubber sponge of the present invention. The term "liquid silicone rubber" refers to a silicone rubber material that is liquid at room temperature and that is cured by heating or the like to form a rubber-like elastic body. Liquid silicone rubbers are classified into addition-reaction-curing liquid silicone rubbers, organic-peroxide-curing liquid silicone rubbers, and condensation-reaction-curing liquid silicone rubbers, etc., and any of these liquid silicone rubbers can be used. Among these, addition-reaction-curing liquid silicone rubbers are preferable because these liquid silicone rubbers have a high curing rate, and are excellent in terms of uniformity of curing.

The blending ratio of a cross-linking agent for cross-linking the liquid silicone rubber is adjusted so as to obtain an elastic layer having a high mechanical strength and appropriate elasticity, and the preferred range of the blending ratio varies depending on the conditions of use of the pressure roller, etc. Accordingly, the preferred range of the blending ratio of the cross-linking agent is not particularly limited. However, the blending ratio of the cross-linking agent is often usually 0.1 to 20 parts by mass, and preferably 0.5 to 10 parts by mass relative to 100 parts by mass of the silicone rubber.

Resin microballoons having outer shells composed of a thermoplastic resin are preferably used. Examples of the thermoplastic resin constituting the outer shells include vinylidene chloride/acrylonitrile copolymers, methyl methacrylate/acrylonitrile copolymers, and methacrylonitrile/acrylonitrile copolymers. It is preferable to use resin microballoons having outer shells composed of a resin having a softening temperature in an appropriate range in consideration of a curing temperature of the liquid silicone rubber. Examples of the evaporable substance encapsulated in the resin microballoons include hydrocarbons such as butane and isobutane.

Unexpanded resin microballoons are commercially available, and examples thereof include "Matsumoto Microsphere F series" (manufactured by Matsumoto Yushi-Seiyaku Co., Ltd.) and "Expancel series" (manufactured by Expancel). These commercially available unexpanded resin microballoons usually have an average particle size of about 1 to 50 μm. Expanded resin microballoons having an average particle size of about 5 to 500 μm are obtained by expanding the unexpanded resin microballoons by heating at an appropriate temperature, and can be used in the production of the silicone rubber sponge of the present invention. In order to form a rubber elastic layer having a high mechanical strength, expanded resin microballoons having an average particle size of 10 to 100 μm are preferred. In order to prevent the resin microballoons from scattering, silicone oil such as dimethylpolysiloxane or methylhydrogenpolysiloxane is blended with the resin microballoons.

The amount of expanded resin microballoons blended in the silicone rubber sponge of the present invention is selected in accordance with a thermal insulation property required for the silicone rubber sponge etc. In general, when a large amount of expanded resin microballoons is blended, the thermal insulation property increases but mixing of the expanded resin microballoons in the silicone rubber tends to be difficult. In general, when the amount of expanded resin microballoons is 1 part by mass or less relative to 100 parts by mass of the silicone rubber, a sufficient thermal insulation property required for a pressure roller cannot be obtained. On the other hand, when the amount of expanded resin microballoons exceeds 5 parts by mass, the viscosity of the resulting silicone rubber compound increases, and mixing and stirring tend to be difficult. However, the expanded resin microballoons can be mixed and stirred in an amount of up to about 10 parts by mass as long as the mass-average molecular weight M1 of the low-molecular-weight silicone rubber is 12,000 or less.

The mixing in step 1 and step 2 can be performed using the same apparatus and the same means under the same conditions as those in the case where a liquid silicone rubber and expanded resin microballoons are mixed in the production of an existing silicone rubber sponge. In order to prevent the resin microballoons from being subjected to breaking or thermal deformation before curing of the silicone rubber, the mixing is preferably performed at a temperature lower than the softening point of the resin constituting the outer shells of the expanded resin microballoons.

The rubber-covered roller of the present invention is produced by providing a silicone rubber compound prepared as described above on the outer periphery of a core, and curing the compound by heating at a temperature lower than the softening point of the resin constituting the outer shells of the resin microballoons. The method for forming a pressure roller by curing a silicone rubber compound by heating is not particularly limited. An example of a method for forming a roller includes arranging a core metal in an inner space of a cylindrical metal mold, injecting a silicone rubber compound between the core and an inner wall of the metal mold, and then curing the silicone rubber by heating the metal mold. Next, as an example of this method, steps of forming a rubber-covered roller will be described with reference to FIG. 1.

FIG. 1 includes cross-sectional views illustrating the production process. Reference numeral 1 in FIG. 1(a) denotes a metal cylinder (cylindrical metal mold). First, a PFA is applied onto the inner surface of the cylindrical metal mold and then cured to form a PFA layer 2. The PFA layer 2 functions as a surface releasing layer after the formation of a rubber-covered roller.

After the PFA layer 2 is formed on the inner surface of the cylindrical metal mold 1, a core 3 is arranged at the center of the inner space of the cylindrical metal mold 1, as illustrated in FIG. 1(b). The core 3 is a column composed of a metal. Besides such a column composed of a metal, a core composed of a material that is generally used as a core of a pressure roller, for example, a resin having high heat resistance, chemical resistance, mechanical strength, etc., such as a polyimide resin, can also be used.

Openings at both ends of the cylindrical metal mold 1 are closed by covers 4. Each of the covers 4 has a hole for holding an end of the core 3, the hole being formed at the center of the cover 4. The core 3 is held by the holes at the center of the inner space of the cylindrical metal mold 1, and a gap having a certain distance is formed between the outer periphery of the core 3 and the inner periphery of the cylindrical metal mold 1 (PFA layer 2).

After the openings at both ends of the cylindrical metal mold 1 are closed by the covers 4, a silicone rubber compound is injected into the gap. An inlet 5 for injecting the silicone rubber compound is provided in each of the covers 4. Here, the silicone rubber compound is prepared by mixing expanded resin microballoons with a low-molecular-weight silicone rubber and uniformly dispersing the expanded resin microballoons to prepare a compound A, and further mixing a high-molecular-weight silicone rubber with the compound A.

Before the silicone rubber compound is injected, a primer for improving the adhesive strength between the PFA layer 2 (surface releasing layer) and a silicone rubber (rubber elastic layer 6) may be applied onto the surface (inner surface) of the PFA layer 2, and dried. A primer for improving the adhesive strength between the silicone rubber (rubber elastic layer 6) and the core 3 may be applied onto the surface of the core 3, and dried.

FIG. 1(c) illustrates a state where the silicone rubber compound is injected from the inlets 5 into the gap. After the silicone rubber compound is injected, the whole cylindrical metal mold 1 is heated to cure the silicone rubber compound (primary vulcanization), thus forming a rubber elastic layer 6 containing the resin microballoons dispersed therein. The heating is conducted at a temperature lower than the softening point of the outer shells of the resin microballoons. If the heating temperature is equal to or higher than the softening point, thermal deformation and breaking of the balloons may occur, and a uniform sponge foam may not be formed. In the case where a commercially available product, such as Matsumoto Microsphere F series, is used as the resin microballoons, this heating is preferably performed at about 150° C. for about one hour.

Figure 2:
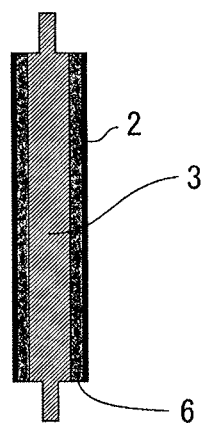
FIG. 2 is a cross-sectional view illustrating an example of a rubber-covered roller of the present invention.
Figure 3:
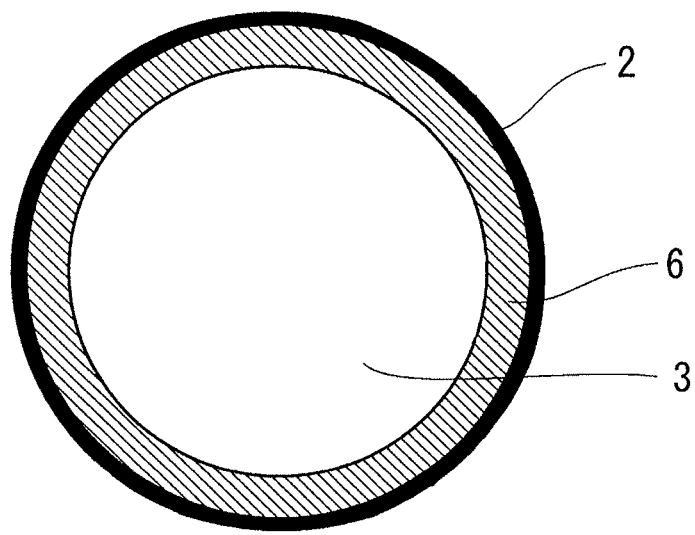
FIG. 3 is a cross-sectional view illustrating an example of a rubber-covered roller of the present invention.

After the formation of the rubber elastic layer 6, the covers 4 and the cylindrical metal mold 1 are removed (demolded). Thus, a rubber-covered roller of the present invention is produced. FIGS. 2 and 3 are cross-sectional views each illustrating the rubber-covered roller produced by the method illustrated in FIG. 1. FIG. 2 is a cross-sectional view taken along a plane including the axis of the roller. FIG. 3 is a cross-sectional view taken along a plane perpendicular to the axis of the roller.

As illustrated in FIGS. 2 and 3, the rubber-covered roller includes the core 3, the rubber elastic layer 6 disposed on the outer periphery of the core 3, and the PFA layer 2 that covers the outer periphery of the rubber elastic layer 6. The PFA layer 2 is a surface releasing layer. The surface releasing layer is optionally provided for the purpose of providing a releasing property to the surface of the pressure roller so as to prevent a toner from adhering to the pressure roller and to prevent a sheet from winding around the pressure roller. The surface releasing layer is preferably composed of a fluororesin having a high releasing property, such as a PFA.

After the rubber-covered roller is removed from the mold, the rubber-covered roller is preferably heated at a temperature equal to or higher than the softening point of the outer shells of the resin microballoons (secondary vulcanization). In the case where a commercially available product, such as Matsumoto Microsphere F series, is used as the resin microballoons, this heating is preferably performed at about 240° C. for about two hours. The resin microballoons are subjected to thermal shrinkage and break due to the heating, and pores are left at positions where the resin microballoons existed. When the resin microballoons are left in the rubber-covered roller and the resulting roller is used as a pressure roller, the fixing performance of the roller may vary with thermal history. However, this problem is prevented by breaking the resin microballoons, and thus the roller can be stably used.

The curing of the silicone rubber is completed by the heating. In addition, air bubbles can be made to be continuous air bubbles by breaking the resin microballoons. The term "continuous air bubbles" refers to air bubbles (pores) connected to each other so that air can pass therethrough, the air bubbles being dispersed in a silicone rubber. In the case of independent air bubbles where the pores in a silicone rubber sponge are independent from each other and air cannot pass through the air bubbles, when air in the air bubbles is expanded by heating, the volume of the air bubbles, and furthermore, the volume of the silicone rubber sponge increase. Accordingly, the diameter of a roller including an elastic layer formed using the silicone rubber sponge is easily changed by heating, and thus continuous air bubbles are preferred.

In the method described above, the PFA layer 2 is formed on the inner surface of the cylindrical metal mold 1, the core 3 is then arranged at the center of the inner space of the cylindrical metal mold 1, and the openings at both ends of the cylindrical metal mold 1 are closed by the covers 4. Alternatively, a rubber-covered roller may be prepared by arranging the core 3 and the covers 4, injecting the silicone rubber, performing curing (primary vulcanization), removing the mold, and performing secondary vulcanization as in the above method without forming the PFA layer 2 on the inner surface of the cylindrical metal mold 1, and the PFA layer 2 (surface releasing layer) may then be formed by covering the surface of the roller (surface of the rubber elastic layer 6) with a PFA tube, and performing heating (for example, at about 290° C. for about 10 minutes). In this method, before the surface of the roller (surface of the rubber elastic layer 6) is covered with the PFA tube, a primer for improving the adhesive strength between the PFA tube and the silicone rubber (rubber elastic layer 6) may be applied onto the silicone rubber, and dried.

EXAMPLES

Examples 1 to 11 and Comparative Examples 1 to 5

Expanded resin microballoons (Matsumoto Microsphere F-50E, manufactured by Matsumoto Yushi-Seiyaku Co., Ltd., simply represented by "balloons" in Tables I to III) were mixed with a silicone rubber 1 (low-molecular-weight silicone rubber) having a mass-average molecular weight (simply represented by "molecular weight" in the tables) shown in Tables I to III so as to have a composition shown in Tables I to III to prepare a compound A. The mixed state at that time was evaluated as described below. The results are shown in Tables I to III on the basis of the criteria described below.

A: Mixing can be performed without problems.
B: Although mixing can be performed, some of balloons are broken.
C: Mixing is difficult, or almost all balloons are broken after mixing.

A silicone rubber 2 (high-molecular-weight silicone rubber) having a mass-average molecular weight (simply represented by "molecular weight" in tables) shown in Tables II and III was mixed with the compound A so as to have a composition shown in Tables II and III to prepare a silicone rubber compound. Note that, in Comparative Examples 1 to 5 described in Table I, the silicone rubber 2 was not mixed.

The silicone rubber compound prepared as described above was cured by heating to prepare a silicone rubber sponge (elastic body). The tensile strength, tensile elongation, tear strength, and tear elongation of the silicone rubber sponge (elastic body) were measured by the methods described below to evaluate durability in terms of pressure roller.

[Tensile Evaluation]

The tensile strength and the tensile elongation at break were evaluated in accordance with JIS K 6250. The evaluation results are shown in the rows of the strength and elongation of the tables.

[Tear Evaluation]

The tear strength and the tear elongation at break were evaluated in accordance with JIS K 6250. The evaluation results are shown in the rows of the strength and elongation of the tables.

[Evaluation of Durability of Pressure Roller]

A pressure roller including a rubber elastic layer (roller elastic layer) composed of the silicone rubber sponge prepared above was prepared. The pressure roller was installed in an actual image-forming apparatus, and a paper-passing test was conducted using the image-forming apparatus. Evaluation was conducted on the basis of the state of the roller elastic layer after the paper-passing test. The results are shown in the rows of "evaluation of pressure roller (durability)" of the tables on the basis of the criteria described below.

AA: Breaking does not occur in the roller elastic layer after 250K sheets have passed thereover.
A: Although breaking does not occur in the roller elastic layer after 200K sheets have passed thereover, breaking is observed after 250K sheets have passed thereover.
C: Breaking occurs in the roller elastic layer after 200K sheets or less have passed thereover.

TABLE I

|  |  | Comparative Example 1 | Comparative Example 2 | Comparative Example 3 | Comparative Example 4 | Comparative Example 5 |
|---|---|---|---|---|---|---|
| Silicone rubber 1 | Molecular weight | 2000 | 5000 | 10000 | 15000 | 20000 |
|  | Parts by mass | 100 | 100 | 100 | 100 | 100 |
| Amount of balloon mixed (parts by mass) |  | 3 | 3 | 3 | 3 | 3 |
| Silicone rubber 2 | Molecular weight | — | — | — | — | — |
|  | Parts by mass | — | — | — | — | — |
| Evaluation of mixing property |  | A | A | A | B | C |
| Tensile evaluation | Strength (N/mm$^2$) | 0.35 | 0.45 | 0.56 | 0.82 | — |
|  | Elongation (%) | 35 | 42 | 55 | 92 | — |
| Tear evaluation | Strength (N/mm) | 1.00 | 1.23 | 1.51 | 2.24 | — |
|  | Elongation (%) | 15 | 21 | 24 | 29 | — |
| Evaluation of pressure roller (Durability) |  | C | C | C | A | — |

TABLE II

|  |  | Example 1 | Example 2 | Example 3 | Example 4 | Example 5 |
|---|---|---|---|---|---|---|
| Silicone rubber 1 | Molecular weight | 2000 | 5000 | 10000 | 10000 | 10000 |
|  | Parts by mass | 20 | 40 | 60 | 80 | 90 |
| Amount of balloon mixed (parts by mass) |  | 3 | 3 | 3 | 3 | 3 |
| Silicone rubber 2 | Molecular weight | 20000 | 20000 | 20000 | 20000 | 20000 |
|  | Parts by mass | 80 | 60 | 40 | 20 | 10 |
| Evaluation of mixing property |  | A | A | A | A | A |
| Tensile evaluation | Strength (N/mm$^2$) | 0.84 | 0.77 | 0.92 | 0.89 | 0.81 |
|  | Elongation (%) | 60 | 58 | 142 | 144 | 63 |
| Tear evaluation | Strength (N/mm) | 2.22 | 2.31 | 2.78 | 2.46 | 2.24 |
|  | Elongation (%) | 30 | 31 | 35 | 34 | 30 |
| Evaluation of pressure roller (Durability) |  | A | A | AA | AA | AA |

TABLE III

|  |  | Example 6 | Example 7 | Example 8 | Example 9 | Example 10 | Example 11 |
|---|---|---|---|---|---|---|---|
| Silicone rubber 1 | Molecular weight | 10000 | 10000 | 10000 | 15000 | 15000 | 15000 |
|  | Parts by mass | 60 | 80 | 90 | 60 | 80 | 90 |
| Amount of balloon mixed (parts by mass) |  | 3 | 3 | 3 | 3 | 3 | 3 |
| Silicone rubber 2 | Molecular weight | 15000 | 15000 | 15000 | 20000 | 20000 | 20000 |
|  | Parts by mass | 40 | 20 | 10 | 40 | 20 | 10 |
| Evaluation of mixing property |  | A | A | A | B | B | B |
| Tensile evaluation | Strength (N/mm²) | 0.72 | 0.79 | 0.71 | 0.95 | 0.90 | 0.85 |
|  | Elongation (%) | 142 | 84 | 62 | 142 | 89 | 72 |
| Tear evaluation | Strength (N/mm) | 2.58 | 2.36 | 2.14 | 2.78 | 2.38 | 2.24 |
|  | Elongation (%) | 34 | 32 | 28 | 34 | 33 | 30 |
| Evaluation of pressure roller (Durability) |  | A | A | A | AA | AA | AA |

As is apparent from the results shown in Tables I to III, in Examples 1 to 11, which are examples of the present invention, the problem in terms of mixed state of the low-molecular-weight silicone rubber and the expanded resin microballoons was small, the mechanical strengths including the tensile strength and the tear strength were high, and durability in terms of the pressure roller was high. In particular, Examples 1 to 8, in which the molecular weight M1 of the low-molecular-weight silicone rubber was 12,000 or less, showed a good mixed state of the low-molecular-weight silicone rubber and the expanded resin microballoons.

In contrast, in Comparative Examples 1 to 3, in which only a low-molecular-weight silicone rubber was used as a silicone rubber, and a high-molecular-weight silicone rubber was not mixed, the mechanical strengths including the tensile strength and the tear strength were low, and durability in terms of the pressure roller was insufficient. Comparative Examples 4 and 5, in which only a silicone rubber having a molecular weight of 15,000 or more was used and the expanded resin microballoons were mixed with the silicone rubber, showed a poor mixed state.

Among Examples, Examples 3, 4, and 5, in which a low-molecular-weight silicone rubber having a molecular weight M1 of 8,000 or more and 12,000 or less and a high-molecular-weight silicone rubber having a molecular weight M2 of 17,000 or more were used (i.e., the invention according to claim 3), showed a good mixed state, achieved a high tensile strength and a high tear strength, and provided a roller having high durability in terms of pressure roller.

Examples 12 to 14 and Comparative Example 6

A silicone rubber (manufactured by Shin-Etsu Chemical Co., Ltd.) having a mass-average molecular weight (simply represented by "molecular weight" in the table, hereinafter the same) of 10,000, expanded resin microballoons (Matsumoto Microsphere F-50E, simply represented by "balloons" in the table, hereinafter the same), and silica were mixed so as to have a composition shown in Table IV to prepare a compound A1. Furthermore, a silicone rubber (manufactured by Shin-Etsu Chemical Co., Ltd.) having a mass-average molecular weight of 10,000, expanded resin microballoons (Matsumoto Microsphere F-50E), and silica were mixed so as to have a composition shown in Table IV to prepare a compound A2. The compound A1 and the compound A2 were mixed to prepare a compound A containing a low-molecular-weight silicone rubber. The mixing property at that time was evaluated by the same evaluation method and the same criteria as those used in Examples 1 to 11. The results are shown in Table IV.

A silicone rubber (manufactured by Shin-Etsu Chemical Co., Ltd.: KE-1950) having a mass-average molecular weight of 20,000 and silica were mixed so as to have a composition shown in Table IV to prepare a compound B containing a high-molecular-weight silicone rubber. The compound B was mixed with the compound A to prepare a silicone rubber compound. Note that, in Comparative Example 6, the compound B was not mixed.

The silicone rubber compound prepared as described above was cured by heating to prepare a silicone rubber sponge (elastic body). The tensile strength and tensile elongation of the silicone rubber sponge (elastic body) were measured by the same methods as those used in Examples 1 to 11 to evaluate durability in terms of pressure roller.

TABLE IV

|  |  |  | Comparative Example 6 | Example 12 | Example 13 | Example 14 |
|---|---|---|---|---|---|---|
| Compound A1 | Silicone rubber | Molecular weight | 10000 | 10000 | 10000 | 10000 |
|  |  | Amount mixed (parts by mass) | 50 | 40 | 33 | 25 |
|  |  | Amount of balloon mixed (parts by mass) | 1.5 | 1.2 | 1 | 0.75 |
|  |  | Amount of silica mixed (parts by mass) | 5 | 4 | 3.3 | 2.5 |
| Compound A2 | Silicone rubber | Molecular weight | 10000 | 10000 | 10000 | 10000 |
|  |  | Amount mixed (parts by mass) | 50 | 40 | 33 | 25 |
|  |  | Amount of balloon mixed (parts by mass) | 1.5 | 1.2 | 1 | 0.75 |
|  |  | Amount of silica mixed (parts by mass) | 7.5 | 6.0 | 5.0 | 3.75 |

TABLE IV-continued

|  |  |  | Comparative Example 6 | Example 12 | Example 13 | Example 14 |
|---|---|---|---|---|---|---|
| Compound B | Silicone rubber | Molecular weight | — | 20000 | 20000 | 20000 |
|  |  | Amount mixed (parts by mass) | — | 20 | 34 | 50 |
|  |  | Amount of silica mixed (parts by mass) | — | 2 | 3.4 | 5 |
|  |  | Evaluation of mixing property | A | A | A | A |
| Tensile evaluation |  | Strength (N/mm$^2$) | 0.17 | 0.30 | 0.34 | 0.53 |
|  |  | Elongation (%) | 44 | 72 | 101 | 215 |
|  |  | Evaluation of pressure roller (Durability) | C | A | A | A |

Examples 15 and 16 Comparative Example 7

Expanded resin microballoons (Matsumoto Microsphere F-50E) and silica were mixed with a silicone rubber (manufactured by Shin-Etsu Chemical Co., Ltd.) having a mass-average molecular weight of 10,000 so as to have a composition shown in Table V to prepare a compound A3. A silicone rubber (manufactured by Shin-Etsu Chemical Co., Ltd.) having a mass-average molecular weight of 10,000, expanded resin microballoons (Matsumoto Microsphere F-50E), and silica were mixed so as to have a composition shown in Table V to prepare a compound A4. Furthermore, a silicone rubber (manufactured by Shin-Etsu Chemical Co., Ltd.) having a mass-average molecular weight of 12,000, metal silicon, and silica were mixed so as to have a composition shown in Table V to prepare a compound A5. The compound A3, the compound A4, and the compound A5 were mixed to prepare a compound containing a low-molecular-weight silicone rubber. The mixing property at that time was evaluated by the same evaluation method and the same criteria as those used in Examples 1 to 11. The results are shown in Table V.

A silicone rubber (manufactured by Shin-Etsu Chemical Co., Ltd.: KE-1950) having a mass-average molecular weight of 20,000 and silica were mixed so as to have a composition shown in Table V to prepare a compound C containing a high-molecular-weight silicone rubber. The compound C was mixed with the compound A to prepare a silicone rubber compound. Note that, in Comparative Example 7, the compound C was not mixed.

The silicone rubber compound prepared as described above was cured by heating to prepare a silicone rubber sponge (elastic body). The tensile strength and tensile elongation of the silicone rubber sponge (elastic body) were measured by the same methods as those used in Examples 1 to 11 to evaluate durability in terms of pressure roller.

TABLE V

|  |  |  | Comparative Example 7 | Example 15 | Example 16 |
|---|---|---|---|---|---|
| Compound A3 | Silicone rubber | Molecular weight | 10000 | 10000 | 10000 |
|  |  | Amount mixed (parts by mass) | 30 | 20 | 15 |
|  |  | Amount of balloon mixed (parts by mass) | 0.9 | 0.6 | 0.45 |
|  |  | Amount of silica mixed (parts by mass) | 3 | 2 | 1.5 |
| Compound A4 | Silicone rubber | Molecular weight | 10000 | 10000 | 10000 |
|  |  | Amount mixed (parts by mass) | 30 | 20 | 15 |
|  |  | Amount of balloon mixed (parts by mass) | 0.9 | 0.6 | 0.45 |
|  |  | Amount of silica mixed (parts by mass) | 4.5 | 3 | 2.25 |
| Compound A5 | Silicone rubber | Molecular weight | 12000 | 12000 | 12000 |
|  |  | Amount mixed (parts by mass) | 40 | 24 | 20 |
|  |  | Amount of metal silicon mixed (parts by mass) | 8 | 4.8 | 4 |
|  |  | Amount of silica mixed (parts by mass) | 4 | 2.4 | 2 |
| Compound C | Silicone rubber | Molecular weight | — | 20000 | 20000 |
|  |  | Amount mixed (parts by mass) | — | 36 | 50 |
|  |  | Amount of silica mixed (parts by mass) | — | 3.6 | 5 |
|  |  | Evaluation of mixing property | — | A | A |
| Tensile evaluation |  | Strength (N/mm2) | 0.20 | 0.36 | 0.58 |
|  |  | Elongation (%) | 46 | 112 | 220 |
|  |  | Evaluation of pressure roller (Durability) | C | A | A |

Examples 17 to 20

Expanded resin microballoons (Matsumoto Microsphere F-50E) and silica were mixed with either of two silicone rubbers (manufactured by Shin-Etsu Chemical Co., Ltd.) shown in Table VI so as to have a composition shown in Table VI to prepare a compound A. The mixing property at that time was evaluated by the same evaluation method and the same criteria as those used in Examples 1 to 11. The results are shown in Table VI.

A silicone rubber (manufactured by Shin-Etsu Chemical Co., Ltd.) having a mass-average molecular weight of 20,000 and silica were mixed so as to have a composition shown in Table VI to prepare a compound D containing a high-molecular-weight silicone rubber. The compound D was mixed with the compound A to prepare a silicone rubber compound.

The silicone rubber compound prepared as described above was cured by heating to prepare a silicone rubber sponge (elastic body). The tensile strength and tensile elongation of the silicone rubber sponge (elastic body) were measured by the same methods as those used in Examples 1 to 11 to evaluate durability in term of pressure roller.

TABLE VI

|  |  |  | Example 17 | Example 18 | Example 19 | Example 20 |
|---|---|---|---|---|---|---|
| Compound A | Silicone rubber | Molecular weight | 10000 | 10000 | 12000 | 12000 |
|  |  | Amount mixed (parts by mass) | 70 | 50 | 70 | 50 |
|  |  | Amount of balloon mixed (parts by mass) | 2.1 | 1.5 | 2.1 | 1.5 |
|  |  | Amount of silica mixed (parts by mass) | 7 | 5 | 10.5 | 7.5 |
| Compound D | Silicone rubber | Molecular weight | 20000 | 20000 | 20000 | 20000 |
|  |  | Amount mixed (parts by mass) | 50 | 50 | 50 | 50 |
|  |  | Amount of silica mixed (parts by mass) | 5 | 5 | 5 | 5 |
|  |  | Evaluation of mixing property | A | A | A | A |
| Tensile evaluation |  | Strength (N/mm$^2$) | 0.31 | 0.55 | 0.78 | 1.00 |
|  |  | Elongation (%) | 88 | 152 | 56 | 85 |
|  |  | Evaluation of pressure roller (Durability) | A | A | A | A |

Referring to the results shown in Tables IV to VI, even in the case where silica and/or metal silicon was blended and in the case where a low-molecular-weight silicone rubber prepared by mixing two or more different types of silicone rubbers or two or more silicone rubbers having different molecular weights was used, a silicone rubber sponge having a high mechanical strength was produced and the mixing property in the production of the sponge was also satisfactory, as long as the mass-average molecular weights M1 and M2 and the mixing ratio of the low-molecular-weight silicone rubber and the high-molecular-weight silicone rubber were in the ranges of the present invention. The results also showed that the pressure roller including this silicone rubber sponge also had high durability.

REFERENCE SIGNS LIST 1 cylindrical metal mold
2 PFA layer
3 core
4 cover
5 inlet
6 rubber elastic layer

The invention claimed is:

1. A silicone rubber sponge produced by mixing expanded resin microballoons with a low-molecular-weight liquid silicone rubber to prepare a compound A, mixing a high-molecular-weight liquid silicone rubber with the compound A to prepare a silicone rubber compound, and heating the silicone rubber compound at a temperature lower than a softening point of the resin microballoons to cure the silicone rubbers, wherein the relationship M2×0.5<(M1×W1+M2×W2)/(W1+W2) is satisfied, M1 is 8,000 or more and is 15,000 or less, and M2 is 17,000 or more, is 20,000 or less and is equal to or more than 1.2×M1 where M1 represents a mass-average molecular weight of the low-molecular-weight liquid silicone rubber, W1 represents the amount (mass) of the low-molecular-weight liquid silicone rubber in the amount of 60-90 parts by weight, M2 represents a mass-average molecular weight of the high-molecular-weight liquid silicone rubber, and W2 represents the amount (mass) of the high-molecular-weight liquid silicone rubber in the amount of 10-40 parts by weight, so that the sum of W1 and W2 totals 100 parts by weight.

2. The silicone rubber sponge according to claim 1, wherein the mass-average molecular weight M1 is 8,000 or more and is 12,000 or less.

3. The silicone rubber sponge according to claim 1, wherein the resin microballoons are broken after curing of the silicone rubber.

4. A rubber-covered roller comprising a core and a rubber elastic layer disposed on a peripheral surface of the core, wherein the rubber elastic layer is composed of the silicone rubber sponge according to claim 1.

* * * * *